US009411942B2

(12) United States Patent
Commons et al.

(10) Patent No.: US 9,411,942 B2
(45) Date of Patent: Aug. 9, 2016

(54) NETWORK DEVICE, SYSTEM AND METHOD FOR RENDERING AN INTERACTIVE MULTIMEDIA PLAYLIST

(71) Applicant: D&M Holdings, Inc., Kanagawa (JP)

(72) Inventors: Christopher Commons, Carmel, IN (US); Brendon Stead, Carlsbad, CA (US)

(73) Assignee: D&M Holdings, Inc., Kanagawa (JP)

( * ) Notice: Subject to any disclaimer, the term of this patent is extended or adjusted under 35 U.S.C. 154(b) by 69 days.

(21) Appl. No.: 14/014,847

(22) Filed: Aug. 30, 2013

(65) Prior Publication Data

US 2015/0067871 A1 Mar. 5, 2015

(51) Int. Cl.
G06F 7/04 (2006.01)
G06F 17/30 (2006.01)
H04N 7/16 (2011.01)
G06F 21/10 (2013.01)

(52) U.S. Cl.
CPC .......... *G06F 21/10* (2013.01); *G06F 17/30053* (2013.01); *G06F 17/30864* (2013.01)

(58) Field of Classification Search
CPC ........................... G06F 21/10; G06F 17/30864
USPC ........................................................ 726/26
See application file for complete search history.

(56) References Cited

U.S. PATENT DOCUMENTS

| 5,621,800 | A | 4/1997 | Weng et al. | |
|---|---|---|---|---|
| 6,728,729 | B1* | 4/2004 | Jawa et al. | |
| 7,689,705 | B1* | 3/2010 | Lester et al. | 709/231 |
| 2006/0253547 | A1* | 11/2006 | Wood et al. | 709/217 |
| 2008/0010372 | A1* | 1/2008 | Khedouri | G06F 17/30094 709/224 |
| 2011/0058675 | A1 | 3/2011 | Brueck et al. | |
| 2011/0118858 | A1* | 5/2011 | Rottler et al. | 700/94 |
| 2011/0252118 | A1* | 10/2011 | Pantos et al. | 709/219 |
| 2012/0060031 | A1* | 3/2012 | Huang et al. | 713/168 |
| 2012/0117598 | A1* | 5/2012 | Pons et al. | 725/40 |
| 2012/0324552 | A1* | 12/2012 | Padala et al. | 726/6 |
| 2013/0073584 | A1 | 3/2013 | Kuper et al. | |
| 2013/0174223 | A1* | 7/2013 | Dykeman et al. | 726/4 |
| 2013/0174271 | A1* | 7/2013 | Handal et al. | 726/27 |
| 2013/0174273 | A1* | 7/2013 | Grab et al. | 726/28 |
| 2014/0244600 | A1* | 8/2014 | Schmidt et al. | 707/692 |
| 2014/0259166 | A1* | 9/2014 | Ghaskadvi et al. | 726/23 |
| 2014/0259185 | A1* | 9/2014 | Cockcroft | 726/28 |

OTHER PUBLICATIONS

Robert Berezdivin; Next-Generation Wireless Communications Concepts and Technologies; 2002; IEEE; p. 108-116.*
The Apple Store, Specification pages for the Apple TV, found online at: http://store.apple.com/us/ipod/ipod-accessories/apple-tv?afid=p219%7CGOUS&cid=AOS-US-KWG, Aug. 29, 2013.
International Search Report and Written Opinion for PCT/US2014/053323 dated Dec. 24, 2014.

* cited by examiner

Primary Examiner — Monjour Rahim
(74) Attorney, Agent, or Firm — Peter A. Nieves; Sheehan Phinney Bass & Green PA

(57) ABSTRACT

A device, method, and system for managing authorization for rendering of digital media recordings by a networked rendering device are disclosed. The device includes a processor and a memory. The device receives metadata identifying a recording of a specific audio performance, and searches for a source providing the recording. The device obtains a token authorizing the source to deliver the recording to the rendering device. The device provides the token to the source, receives the recording from the source, and renders the recording. An agent may serve as an intermediary between the rendering device and the source.

30 Claims, 9 Drawing Sheets

NETWORK DEVICE, SYSTEM AND METHOD FOR RENDERING AN INTERACTIVE MULTIMEDIA PLAYLIST

FIELD OF THE INVENTION

The present invention relates to network multimedia and more particularly, is related to networked digital multimedia devices and services.

BACKGROUND OF THE INVENTION

Many techniques exist for allowing individuals to access digital multimedia over the internet. Digital multimedia includes audio and video files. One challenge of providing access to digital multimedia over the internet is securing licensing rights of the performers, publishers and owners of the digital multimedia. There are different models of digital multimedia delivery. For example, a download store may provide a purchased digital multimedia file for download to an internet access device of a purchaser. A downloaded audio file may include digital rights management (DRM), which may restrict which devices may play the multimedia file.

Another model is a streaming service, where instead of downloading a multimedia file, a stream of the content of the multimedia file is transmitted to a device of a subscriber where the stream is buffered for rendering, but not otherwise stored. Internet radio is another delivery system that provides access to music selected and programmed by the provider, much like a conventional radio station except the delivery is via the internet instead of radio.

Another type of digital multimedia delivery uses a cloud service. Utilization of network storage of data files accessible via the internet is known as cloud storage. Services that provide cloud storage are called cloud services. Digital music players with access to cloud music services have made it possible for users to listen to music in their digital collection without requiring direct access to physical media storing music data. Users can wirelessly access music from a cloud service wherever they have internet access. Certain cloud music services allow a subscriber to license a song in the library of the cloud service, so that song is thereafter available to be streamed and/or downloaded to the subscriber on demand. Certain services allow subscribers to identify or upload music files already purchased/licensed by the subscriber to the cloud music service for access via cloud service. For example, a subscriber may identify a file on the service already owned by the subscriber in another format, or the subscriber may upload a file ripped from a compact disc (CD) owned by the subscriber.

While these and other delivery systems differ from one another in significant ways, each of these delivery systems is intended for rendering of the digital multimedia by an individual or organization with authorization to play the digital multimedia. Forms of such authorization include, for example, purchase of physical media containing the music file, for example, a CD, purchasing a digital download of the file, for example, an mp3 file, purchasing a subscription to a music streaming service, and purchasing a license to access specified songs on a cloud music service.

FIG. 1 shows a prior art digital multimedia hub 100. The hub 100 contains a controller 110, a network interface 130, a storage device 150, an audio/video processor 140 and an audio/video output 142. The storage device 150 may store digital multimedia files therein. The audio/video output 142 outputs audio and/or video to an audio/video system 180, for example, a home entertainment center with a video display 184 and at least one loudspeaker 188, and provides media file and internet media service access to the audio/video system 180. The hub 100 includes a network interface 130 providing access to a local area network (LAN) 260. The LAN 260 may provide wired and or wireless access to network devices, including access to the internet 290, for example, via a cable modem (not shown), as well as access to consumer electronic devices in the LAN 260, such as a tablet computer 264, a handheld mp3 player 266, or a personal computer 268.

The hub 100 provides a user interface allowing access to play media files stored on the consumer electronic devices 264, 266, 268 via the audio/video system 180. For example, the hub 100 may use the video display (184) for user interface purposes, for example, to display a menu of commands and/or services. The hub 100 may receive input via a remote control device, for example, a radio frequency remote or an infrared remote control (not shown), or via a controller application on the consumer electronic devices 264, 266, 268. The hub 100 may access streamed content from one or more digital media services 295, for example, on-demand video and/or audio streaming services, via the internet 290. In addition, the hub 100 may store account information for the digital multimedia services 295 in the storage device 150. For example, the hub 100 may store the username and password of an account holder for the digital multimedia service 295. The hub 100 stores account information of a single account holder for each digital multimedia service 295. The hub 100 is limited to accessing a preset list of digital multimedia sources, and is further limited to providing the rendering to a single audio/video system 180 connected to the hub.

Many people enjoy listening to music during a social gathering. Individuals in these gatherings may wish to share songs from their personal music collections for the gathering. However, due to the variety of digital music delivery systems and digital rights management systems, it may be difficult or inconvenient to share songs from the digital collection of an individual with the gathering using prior art such as the digital multimedia hub 100 without violating license agreements for the digital multimedia. Furthermore, individuals at the gathering may find it difficult or inconvenient to access music they discovered at the gathering. Therefore, there is a need in the industry to address the abovementioned limitations.

SUMMARY OF THE INVENTION

Embodiments of the present invention provide a network device and method for rendering an interactive multimedia playlist. Briefly described, a first aspect of the present invention is directed to a method for managing authorization for playback of multimedia recordings by a networked rendering device including a processor and a memory, having the steps of receiving a song having metadata identifying a recording, searching for a source providing the recording, obtaining a token authorizing the source to deliver the recording to the rendering device, providing the token to the source, receiving the recording from the source, and rendering the recording by the rendering device.

Briefly described, a second aspect of the present invention is directed to a method for managing authorization for rendering recordings by a networked rendering device including a processor and a memory, including the steps of receiving a song having metadata identifying a recording into a song library, adding the song to a playlist, searching for a source providing the song, receiving the recording from the source, and rendering the recording.

Briefly described, a third aspect of the present invention is directed to a method for managing digital media in a network by a processor with a memory, including the steps of receiving a playlist having a song including metadata identifying a recording, and searching for a first source providing the recording from a pre-defined plurality of authorized sources. If the searching yields the first source, a recording is rendered from the first source. If the searching does not yield the first source, the network is searched for a second source providing the recording.

Briefly described, in architecture, a fourth aspect of the present invention is directed to a device for rending digital media in a network. The device includes a network interface, a processor with a memory, a song library stored in the memory, and a playlist stored in the memory. The processor is configured to execute non-transitory instructions stored in the memory to perform the steps of receiving a song having metadata identifying a recording of a specific audio performance into the song library, adding the song to the playlist, searching for a source providing the song, receiving the recording from the source and rendering the recording by the rendering device. The recording is not retained in the memory after the rendering.

Briefly described, in architecture, a fifth aspect of the present invention is directed to a system for rendering digital media in a network having a first digital media rendering device and a second digital media rendering device. The first and second rendering devices each include a network interface, and a processor with a memory configured to execute non-transitory instructions stored in the memory to perform the steps of receiving a song having metadata identifying a recording into a song library, adding the song to a playlist, searching for a source providing the song, receiving the recording from the source, and rendering, by the rendering device, the recording. The recording is not retained in the memory after the rendering. The second digital media rendering device is switchably configured to render the recording in synchronization with the first digital media rendering device.

Briefly described, in architecture, a sixth aspect of the present invention is directed to a system for rending digital media in a network, including an agent and a media rendering device. The agent includes a first network interface and a first processor with a first memory. The first processor is configured to execute non-transitory instructions stored in the first memory to perform steps, including receiving via the first network interface a first query having a song having metadata identifying a digital media recording, formatting the metadata into a second query to a digital media service, and transmitting the second query to the digital media service via the first network interface. The media rendering device includes a second network interface, and a second processor with a second memory. The second processor is configured to execute non-transitory instructions stored in the second memory to perform steps including formatting the first query, transmitting via the second network interface the first query to the agent, receiving the digital media recording from the digital media service via the second network interface, and rendering the digital media recording. The digital media recording is not retained in the second memory after the rendering.

Briefly described, in architecture, a seventh aspect of the present invention is directed to a network agent serving as an intermediary between a media rendering device and a digital media service. The network agent includes a network interface, and a processor with a memory. The processor is configured to execute non-transitory instructions stored in the memory to perform the steps of receiving from the media rendering device via the network interface a first query having a song including metadata identifying a digital media recording, formatting the metadata into a second query conforming to an application interface of a digital media service, and transmitting the second query to the digital media service via the network interface.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

Figure 1:
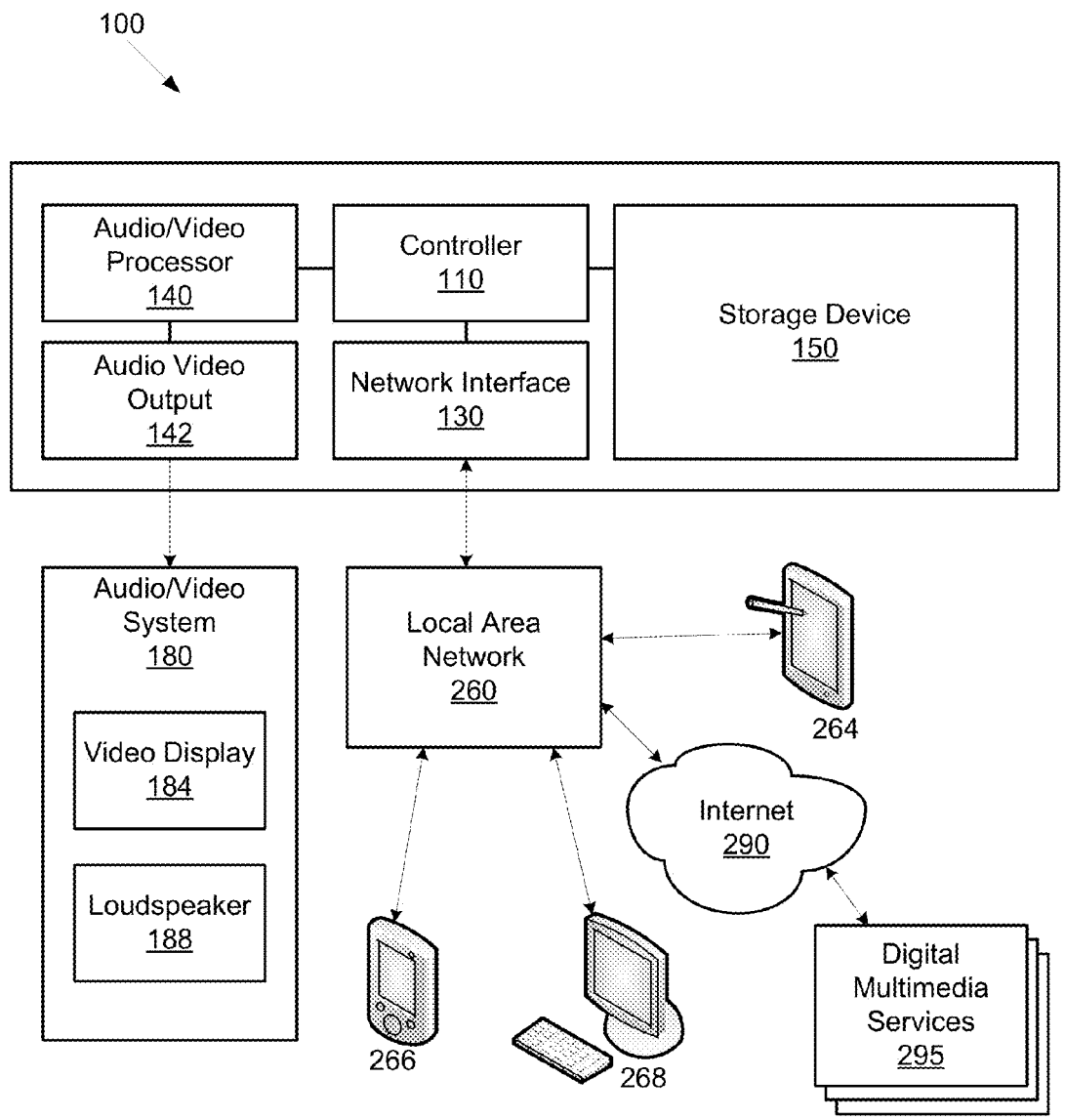
FIG. 1 is a schematic diagram showing a prior art digital multimedia hub.

Reference will now be made in detail to embodiments of the present invention, examples of which are illustrated in the accompanying drawings. Wherever possible, the same reference numbers are used in the drawings and the description to refer to the same or like parts.

The following definitions are useful for interpreting terms applied to features of the embodiments disclosed herein, and are meant only to define elements within the disclosure. No limitations on terms used within the claims are intended, or should be derived, thereby. Terms used within the appended claims should only be limited by their customary meaning within the applicable arts.

As used within this disclosure, a "song" is metadata used to identify an audio and/or video recording. The metadata may include a song title, a performing artist, a publisher, a version of the song, a length of the song, a recording date of the song, a recording venue indicating where the performance of the song was recorded, a mastering date of the song, and other information that identifies a specific version of the recording. The song does not include audio or video itself, but instead, only information used to identify the recording. The song does not generally include proprietary information. A recording of a song is needed in order to render (play) a song. "Rendering a song" is shorthand for rendering a recording identified by a song.

As used within this disclosure, a "recording" refers to stored audio and/or video information used to render playback of a song, for example, but not limited to, analog audio on magnetic media, audio samples in WAV or MP3 formatted data, or compressed or uncompressed digital video such as MP4 or AVI formatted data. The content of the recording is identified by a song. A recording may be stored in analog form, for example, on magnetic recording media, or in digital form, for example, as digitized samples of analog waveforms stored on digital media, including, but not limited to, magnetic media, optical media, and electronic media.

As used within this disclosure, "rendering" a song means audio and/or video reproduction of a recording associated with the song, for example, playing a stored audio/video file of a recording, or playing streamed media of the recording identified by the song.

As used within this disclosure, a "source" is a provider of an audio and/or video recording. The source makes a recording identified by a song available for rendering. Examples of sources include an audio file stored on local media, such as a data drive, and a service, for example, a cloud based media streaming service, or internet radio. A source may provide a digital output or an analog output (signal).

As used within this disclosure, a "playlist" is a modifiable data structure containing an ordered list of zero or more songs. A playlist may be stored, for example, on a speaker, a server, or smartphone/tablet. A playlist may be modified to add, remove, and/or re-order songs. Since playlists do not contain audio or video content they are generally small in size and therefore readily transportable. A display playlist is a text listing of the songs in a playlist, and may include a subset of identifying parameters of a song, such as title, artist, and date.

As used within this disclosure, a "library" is a searchable list of songs stored on a storage device. Unlike a playlist, songs in a library are not generally ordered. A library is generally searchable to locate a single song and/or a class of songs, for example, by parameters such as title, artist, and recording date, among others. A library may be available to a media rendering device. Songs may be selected from a library for inclusion in a playlist.

A playlist and/or library may be "published" by providing a human and/or machine readable listing of the contents of the playlist, for example, to the user interface of a rendering device or to an electronic device in communication with the rendering device.

As used within this disclosure, "streaming" refers to a process of transmitting digital multimedia of a recording by a source to a receiving device. The receiving device may begin rendering the recording before the entire recording has been transmitted. Streaming is generally transitory, such that the streamed data is not retained after it has been rendered. Portions of a received stream may be buffered for rendering, for example, to ensure rendering is uninterrupted during short interruptions of the streamed transmission. In contrast, a downloaded digital multimedia file is generally received in its entirety before it may be rendered. A downloaded digital multimedia file is generally retained in a memory for subsequent rendering, while a streamed file is generally re-streamed for subsequent renderings. "Streaming a song" is shorthand for streaming digital media of a recording identified by a song.

As used within this disclosure, a "speaker" is a networked multimedia audio device for rendering, having access to at least one playlist of songs and access to one or more sources.

An authorized source is a source of one or more recordings licensed to at least one individual within the local area network (LAN) of a speaker or other rendering device in communication with the source. A local source, for example, a device storing recordings within the LAN, is generally assumed to be authorized.

As used within this disclosure, a "token" is a representation of authorization to render one or more songs from a source. Authorization indicates access to a source by at least one licensed user of the source or subscriber to the source. For example, a token may be a virtual certificate, and may provide a speaker access to a digital media service, such as Spotify® or Rhapsody®.

As used within this disclosure, "local media" is a source having a storage device storing one or more recordings, wherein the source is located within the LAN of a rendering device. A recording on local media may be thought of as having an implied token. Examples of local media include an mp3 player, a hard drive, a thumb drive, an optical disc (such as a CD), and a LAN with access to a household/facility music server. Local media may communicate with a speaker via an analog or digital audio and/or video interface, a computer bus, for example, a universal serial bus (USB), or wirelessly via Bluetooth, WiFi, RF, or other wireless connection means.

While the embodiments described below generally describe rendering of audio recordings, it is to be understood that other embodiments may render other types of multimedia recordings, including video and/or audio, among others.

Figure 2:
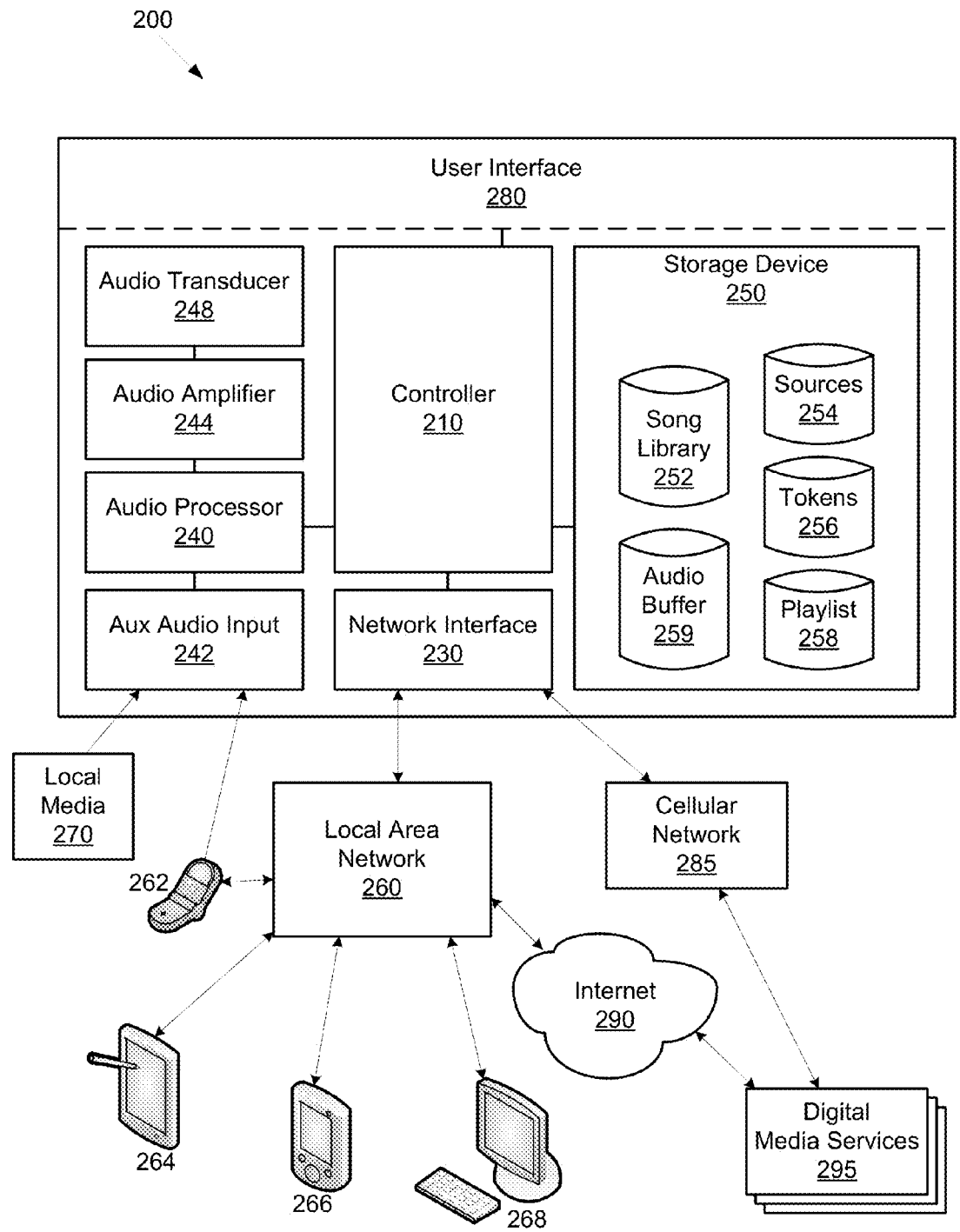
FIG. 2 is a block diagram of a first exemplary embodiment of a license managing media rendering device.

FIG. 2 is a schematic diagram illustrating a first embodiment of a speaker 200. The speaker 200 is a music playback and authorization management device including a controller 210 having a memory 300 therein, a network interface 230, and a storage device 250. The controller 210 may be a computer and/or processor, and generally controls operation of the speaker 200.

A user interface 280 provides a user of the speaker 200 with access to control various parameters of the speaker 200. An example of such a user interface may include, but is not limited to, a graphical user interface (GUI). The user interface 280 may be accessed directly from the speaker 200, for example, via a touchscreen (not shown) on or attached to the speaker 200. Alternatively, or in addition to a local user interface on the speaker, the user interface may be provided via one or more devices in the local area network 260, for example, via an app on a smartphone 262, tablet 264, handheld mp3 player 266, or personal computer 268.

The user interface 280 may be used to provide access to a playlist 258 and/or a song library 252 stored on the storage device 250. The playlist 258 lists one or more songs in an ordered queue for playback by the speaker 200 (e.g. sequential, random). The user interface 280 allows the user to manage the playlist 258, for example, by adding songs to the playlist 258 from the song library 252. The song library 252 is a list of all songs available for rendering by the speaker 200. The user may also delete or reorder songs in the playlist 258, as described further below.

The speaker 200 includes several components for rendering audio files. An auxiliary audio input 242 is used to physically connect and receive audio recordings from a local media device 270 connected to the auxiliary audio input 242. For example, the auxiliary audio input 242 may include a cable receptacle for connecting an analog or digital audio cable connected to an MP3 player, optical disc player, phonograph player, or other device providing analog or digital audio playback. Similarly, the auxiliary audio input 242 may be a digital media access port for example, a universal serial bus (USB) port for connecting a local media device 270 storing digital audio files, such as a thumb drive or a hard drive, or a smartphone 262.

An audio processor 240 is used to process recordings in one or more forms accepted by the speaker 200, for example, digital audio files, digital audio streams, and audio signals received via the auxiliary audio input 242. The audio processor 240 may convert digital data into an audio signal, for example, with a digital to analog converter (DAC), and provide audio processing features, for example, equalization, compression, filtering, and volume level control, among others. The audio processor 240 provides an audio signal to an audio amplifier 244, which provides gain stages to amplify the audio signal from the audio processor 240. The audio amplifier 244 provides an amplified audio signal to one or more audio transducers 248. The audio transducer 248 converts the amplified audio signal from the audio amplifier 244 into sound waves.

In accordance with an alternative embodiment of the invention, the audio processor 240, the audio amplifier 244, and/or the audio transducer 248 may be housed separately from other components in the speaker 200. In addition, in accordance with separate alternative embodiments of the invention, the controller 210, network interface 230, and/or storage device 250 may be removable from the speaker 200 or a stand-alone unit that communicates with the speaker 200.

The storage device 250 contains a list of sources 254. The sources 254 have been collected from one or more users of the speaker 200, and may be referenced to access any song in the song library 252.

Sources may be prioritized based on a number of criteria. Such criteria may include, but are not limited to, the quality of network connection between the speaker 200 and the source (speed, congestion, number of network hops), the cost for using the source, whether a source has a limit to how many songs may be accessed over a time period, and the audio quality provided by the service (bit depth, sampling rate, compression format). For example, if source A and source B both offer song 1, the speaker 200 may request song 1 from source A if source A provides a recording of song 1 having higher audio quality than the recording of song 1 provided by source B.

Tokens are used to provide verification to a source that access to digital media files is authorized. The storage device 250 contains a list of tokens 256. Tokens may be associated with individual songs, with a subscriber to a source, or with a source. The token may be provided to the speaker 200 by a source or a subscriber to the source at the time a song is added to a playlist 258 and/or song library 252, or may be provided only shortly prior to a time when the media file for a song is rendered. If tokens are provided substantially at the time of rendering, for example, at or near the time the song reaches the head of the playlist, the speaker 200 may not store a list of tokens 256 in the storage device 250. However, if tokens are provided to the speaker 200 at a time significantly before rendering, for example, at a time when the song is added to the playlist or library, the tokens may be stored in the list of tokens 256 in the storage device 250.

A token provides authorization to access a digital media file from a source. The token may provide identifying information of a subscriber or account holder for the source, for example, a username and password or personal identification number (PIN). The identifying information is preferably encrypted to secure the identifying information. Alternatively, the token may not include identifying information, but instead information indicating an authorization protocol to be used to authenticate access to the source.

When a subscriber adds a song to the playlist 258 on the speaker 200, the controller 210 may obtain one or more tokens associated with the subscriber from the source. The token may provide authorization to all songs available from the source, or may only provide authorization to a subset of one or more songs available from the source. In general, a token is an authorization provided by a source to stream a rendered song from the source. The token may be obtained from the source by providing identifying credentials of a user/subscriber of the source in exchange for the token. In general, the form of the token is determined by the source, and may have a different form or format for each source.

Figure 3:
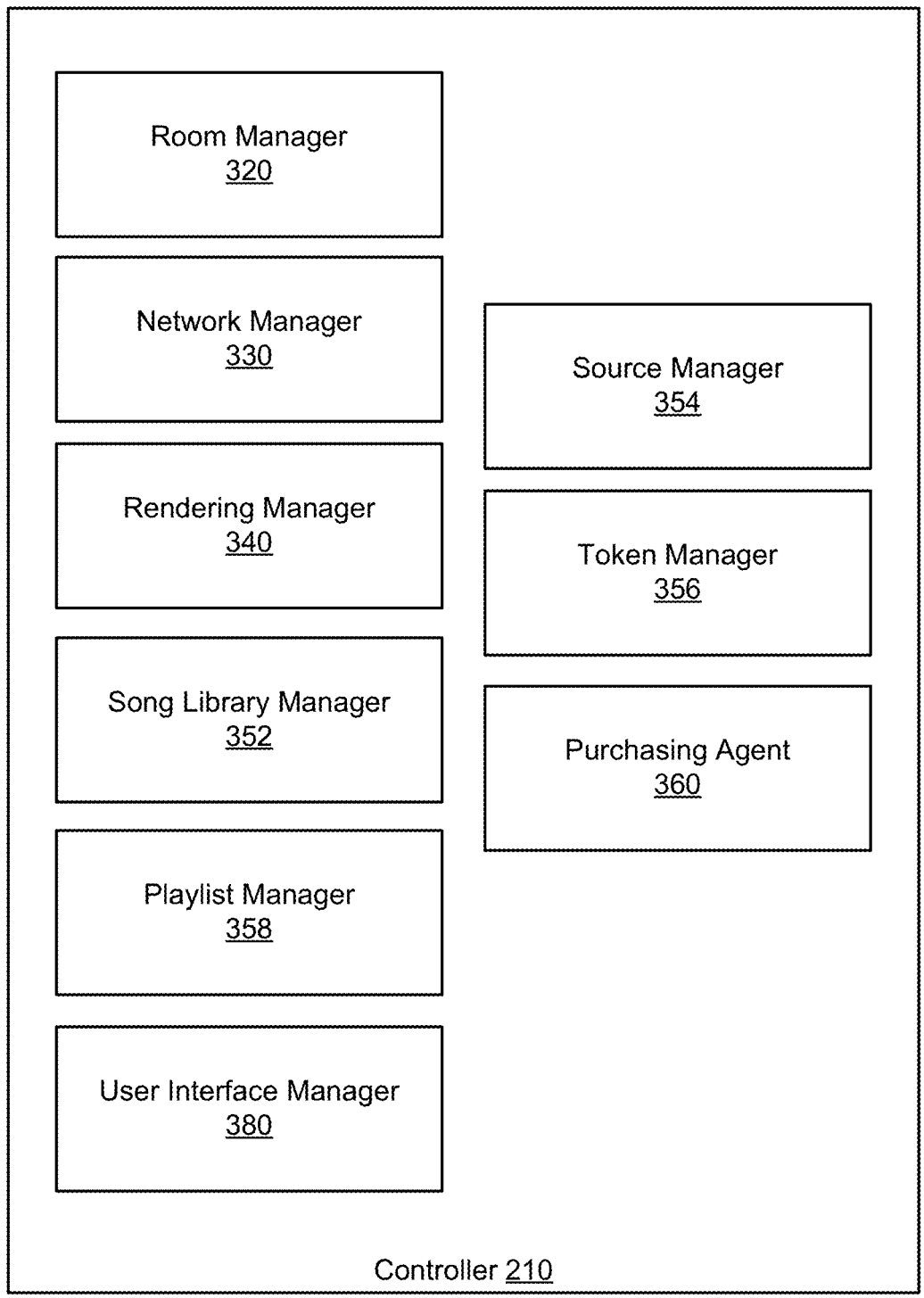
FIG. 3 is a block diagram showing exemplary software modules executed by the rendering device of FIG. 2.

A source may respond to receipt of a token in several ways. For example, the source may immediately initiate transmission for rendering, for example, via download or streaming. The source may instead acknowledge the token and await a subsequent command to initiate transmission for rendering. Alternatively, the source may reject a token, and indicate the token is invalid to the controller 210 with a negative acknowledgement message. Each source may have its own interface, and may be managed by a source manager 354 (FIG. 3).

The audio buffer 259 is a portion of the storage device 250 used to temporarily store audio data of a song being rendered. For example, the audio buffer 259 may be used to assemble portions of an audio stream for rendering by the audio processor 240. The audio stream is streamed to the speaker 200 by a source.

Alternatively, the audio buffer 259 may temporarily store a recording transferred from a user device 262, 264, 266, 268 of a user in the LAN 260. Such a recording is generally fetched from the user device 262, 264, 266, 268 at the time or shortly before the associated song metadata arrives at the head of the playlist 258, and is stored in the audio buffer 259 while the song is being rendered by the audio processor 240, and is then erased from the audio buffer 259 or overwritten in the audio buffer 259 after rendering is complete. The audio buffer 259 may be implemented in a volatile storage, for example a read only memory (RAM), so that contents of the audio buffer 259 are not retained over a power cycle of the speaker 200.

The present system and method ensures that a recording is only rendered when the owner or licensee of the recording is present within the LAN 260 at the start of rendering. The controller 210 does this by only downloading recordings from a device 262, 264, 266, 268 within the LAN 260 (presumably a device of a person present at the facility), and only retaining the recording during rendering. The recording may be rendered as many times as desired, but is preferably downloaded freshly from the owner/licensee device to the audio buffer 259 before each rendering. A new rendering of the recording may not commence after the owner/licensee of the recording leaves the network, unless another source for the recording is found, for example, another individual within the LAN 260 subscribed to a provider providing the recording.

The network interface 230 provides an interface between the speaker 200, the local area network 260, the internet 290, and a cellular network 285. The network interface 230 may allow the user to select which of the local area network 260, the internet 290, and a cellular network 285 may be searched or accessed for sources.

In an alternative embodiment, if no valid token is available for any source offering a song, for example, a song in an active playlist, the user is offered the opportunity to obtain a token, for example, by subscribing to a music service, downloading an audio file, or adding the song to a cloud music service. Such a transaction may be brokered by the purchasing agent 360 (FIG. 3).

The speaker 200 may add any song from the song library 252 to the playlist 258. The song library 252 may be dynamic, and may expand as additional sources become available to the LAN 260, and may contract when sources are no longer accessible. The song library 252 may include all songs stored on the devices 262, 264, 266, 268 in the LAN 260, and all songs accessible to the devices 262, 264, 266, 268 via sources available to the devices 262, 264, 266, 268. A song in the song library 252 may be removed from the library 252 if the sole source of the song is no longer accessible to the LAN 260, for example a device 262, 264, 266, 268 providing the sole source of the song is turned off or is physically removed from or becomes otherwise inaccessible to the LAN 260.

A song in the playlist 258 may be rendered one or more times. For example, with a first source, rendering of the song may be repeated without having to obtain a second token. However, a second source may require that a fresh token be obtained for each rendering. A third source may associate a timestamp with a token, so that the speaker 200 may render the song any number of times using a single token within a time window, for example, within one hour or one day of the time indicated by the timestamp.

Invalidation, revocation, or expiration of a token may cause the speaker 200 to respond in different ways depending upon the source. A song being rendered from a first source may cause the speaker 200 to immediately cease rendering and proceed to rendering the next song in the playlist 280. Alternatively, a song being rendered from a second source may continue to play when a token expires or is invalidated, but is removed from the playlist 280 to prevent subsequent renderings without obtaining another token, from the same source or from another source.

When a user makes a song available to the speaker 200, the song may be added to the speaker playlist 258, the song library 252, or both. If the user has access to the recording via an online music service, the user may transfer a token to the speaker 200 authorizing the speaker 200 to access the song via the online music service, while the user is in the vicinity of the speaker 200. For example, the speaker 200 may communicate with an intermediate web server (not shown) that interacts with the music service to obtain the token, as described further below. The vicinity of the speaker 200 may be determined by several means, for example, detecting a WiFi enabled device 262, 264, 266, 268 belonging to the user in the LAN 260.

As shown by FIG. 3, the controller 210 may include several software modules for managing specific tasks for the speaker 200 (FIG. 2). FIG. 3 shows several exemplary modules that may not be present in all embodiments of a speaker 200 (FIG. 2). Similarly, additional modules may be included in the speaker 200 (FIG. 2) that are not depicted in FIG. 3. In alternative embodiments, functions performed by one or more of the modules depicted in FIG. 3 may be performed by a device external to the speaker 200 (FIG. 2), for example, an intermediate web server that acts as an agent between the speaker 200 (FIG. 2) and one or more sources, as described further below.

Figure 4:
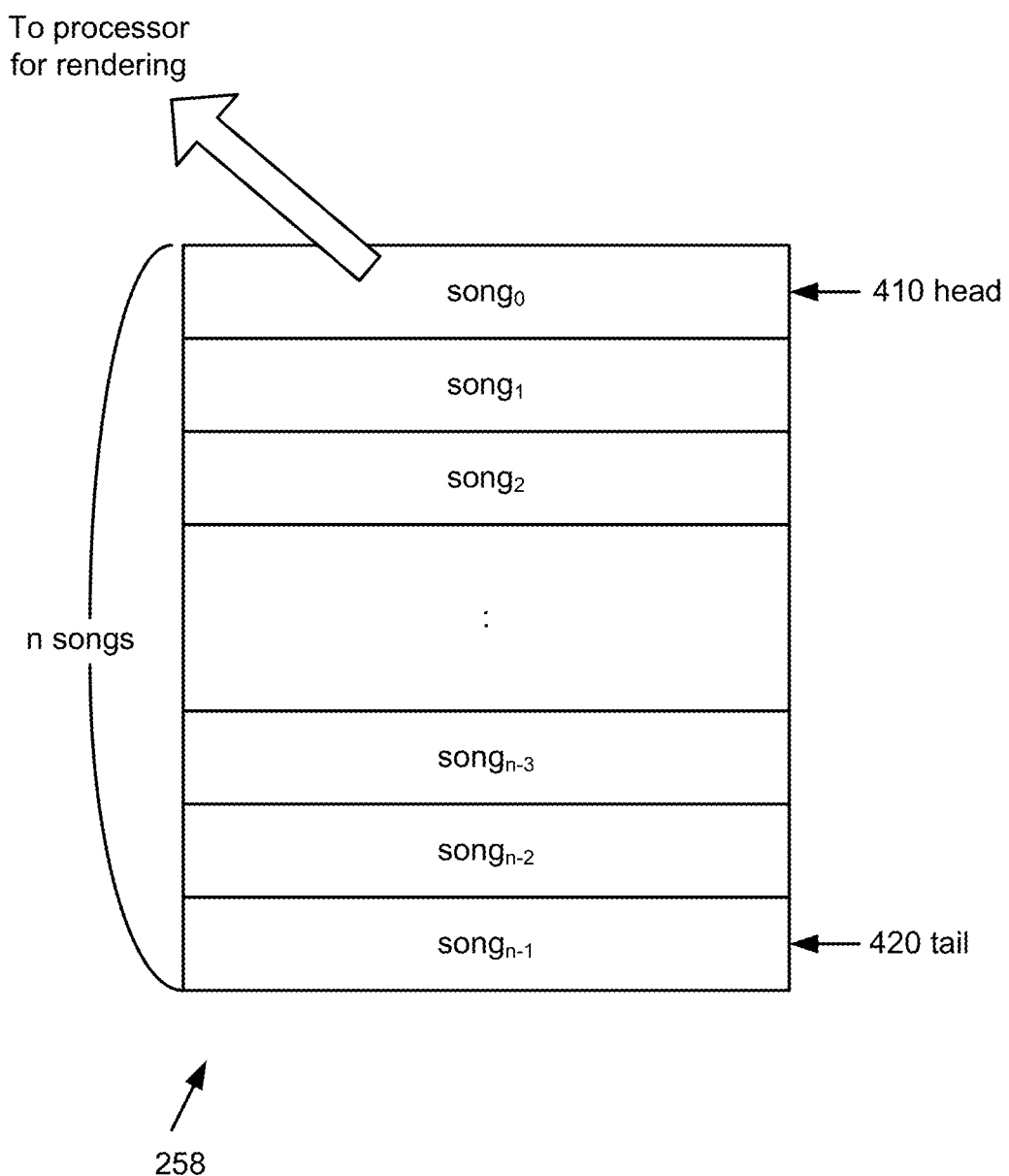
FIG. 4 is a block diagram of an exemplary structure of the playlist of FIG. 2.

The user interface manager 380 allows a user to manage the playlist 258 (FIG. 4). In this capacity, the user interface manager 380 acts as an interface between the user and the playlist manager 358, providing the user with access to one or more of the functions of the playlist manager 358, for example, advancing the playlist 258 (FIG. 4) to the next song in the playlist 258, removing a song from the playlist 258, or adding a song from the song library 252 to the playlist 258 (FIG. 4), as described further below.

The user interface manager 380 provides a browser that allows a user to browse the song library 252 (FIG. 2) on the speaker, for example, by artist, title, genre, recording date, etc. The browser may interact with the song library manager 352. For example, a user may enter an artist name into the browser, and the user interface manager 380 compiles a first list containing all songs in the song library 252 (FIG. 2) by the artist. The browser may then interact with the source manager 354, by querying the source manager 354 as to whether a current source is available for each song in the first list. If a source offering the song recording is available, the user interface manager 380 may query the token manager 356 to determine if a valid token for the song exists, and if so, the song is added to a second list. The user interface manager 380 may then present the first list and/or the second list to the user via the user interface 280 (FIG. 2), for example, in a scrollable window. The user may then select a song from the first or second list to be added to the playlist 258 (FIG. 4). Since songs in the second list have been validated with a source, as described above, the song may be moved directly from the second list to the playlist 258 (FIG. 4). Songs selected from the first list may be validated with the source manager 354 and/or token manager 356 before being moved to the playlist 258 (FIG. 4).

The source manager 354 may interact with external sources, such as digital media services 295 (FIG. 2) via an interface provided by the external source, for example, a web site or an application interface (API) provided by the source. The source manager 354 converts song metadata into a message or query according to the API of the source to determine the availability of a song, and to obtain other information, for example, but not limited to, pricing information for streaming the song, artwork associated with the song, song lyrics, and information regarding the artist performing the song.

The user interface manager 380 also allows a user to make one or more songs from the song collection of the user available to the song library. For example, a user may have a music rendering device, such as a smart phone for playing songs from the collection of the user. Some songs may be associated with recordings stored on the smart phone, others available via a cloud service, and still others available via a subscription service.

A room manager module 320 is used to synchronize rendering of multiple speakers 200 (FIG. 2), as described further below. A network manager module 330 is used to manage settings on various networks the speaker 200 (FIG. 2) communicates with, for example, the LAN 260 (FIG. 2) and the cellular network 285 (FIG. 2). The rendering manager module 340 handles routing streams and downloads received via the network interface (FIG. 2) to the audio processor 240 (FIG. 2). The purchasing agent 360 brokers the purchase of a recording if no source for a song is currently available to the speaker (FIG. 2).

The playlist 258 is a data structure in the storage device 250 of the speaker 200. FIG. 4 shows a block diagram indicating an exemplary structure of the playlist 258. The playlist 258 contains n songs, where n is a non-negative integer. Users may interact with the playlist, for example, with an application on a network device 262, 264, 266, 268 (FIG. 2). The playlist 258 may be expanded by adding songs, or contracted by removing songs, for example using the playlist manager module 358 (FIG. 3). The playlist 258 has a head 410, indicating the position of the next song to be rendered by the speaker 200 (FIG. 2), shown by FIG. 4 as $song_0$. Songs may be removed from the head position for rendering by the audio processor 240 (FIG. 2), at which time the song sequentially after the former head position moves to the head position, for example, song' of FIG. 4. The tail 420 indicates the last song in the playlist. In some embodiments, the head may point to the song currently being rendered.

A person having ordinary skill in the art will realize that as implemented, locations of songs in the storage device 250

(FIG. 2) do not generally change as songs are added to the queue, removed from the queue, or re-ordered in the queue. Instead, mechanisms for managing songs in the playlist without moving the song metadata in the storage device 250 (FIG. 2) are employed, for example, a singly or doubly linked list. Indeed, the playlist 258 may not be a separate data structure containing song data, but instead be a linked list referencing song data files or data structures stored in the song library 252 (FIG. 2).

While the playlist 258 (FIG. 2) is depicted as being linear, other types of playlists are possible. For example, a circular queue style playlist may continuously play. In such a circular structure, the head 410 and tail 420 may be thought of as being adjacent.

Songs moved to the playlist 258 may be moved to the head 410, replacing the head, to the tail 420, or to any position between the head and tail, for example, to queue the song to play immediately after the currently playing song (the head 410). In some circumstances, the head 410 and the tail 420 may point at the same song, for example in a playlist 258 containing a single song. Similarly, for an empty playlist 258, both the head 410 and the tail 420 may point at a null entry.

A speaker 200 (FIG. 2) may store one or more playlists 258, and designate one of the playlists to be rendered via the user interface 280 (FIG. 2). The playlist being rendered is the active playlist.

Since transfer of a recording from the device of a user who is not the owner of the speaker to the speaker may generally violate music licensing agreements in some circumstances, recordings on the device of a user may instead by streamed from the user device to the speaker (FIG. 2) when the song arrives at the head of the playlist for rendering (see below). Streaming may be wireless, for example via a WiFi or Bluetooth connection, among others.

Two or more speakers may be linked in a system. When multiple speakers are being used within earshot of one another, it is generally desirable that they each simultaneously play the same playlist. Speakers in such a configuration are considered to be in the same "room," or "stage," and may be linked to respond to the same transport (start and stop) controls, and access the same playlist. Speakers in separate rooms in a common network may be similarly linked. In some situations, it may be desirable for speakers in separate rooms to share a common song library, but not be linked, so different rooms may have independent playlists and speaker transport controls.

Linked speakers may be configured so that one speaker acts as a primary or master, such that control and memory of the primary speaker are used to control one or more secondary (slave) speakers, and the secondary speakers do little more than render audio streamed to them from the primary speaker and relay user interface commands to the primary speaker. Alternatively, linked speakers may share resources such as memory and processing power, performing essentially as a distributed system, familiar to persons having ordinary skill in the art.

Figure 5:
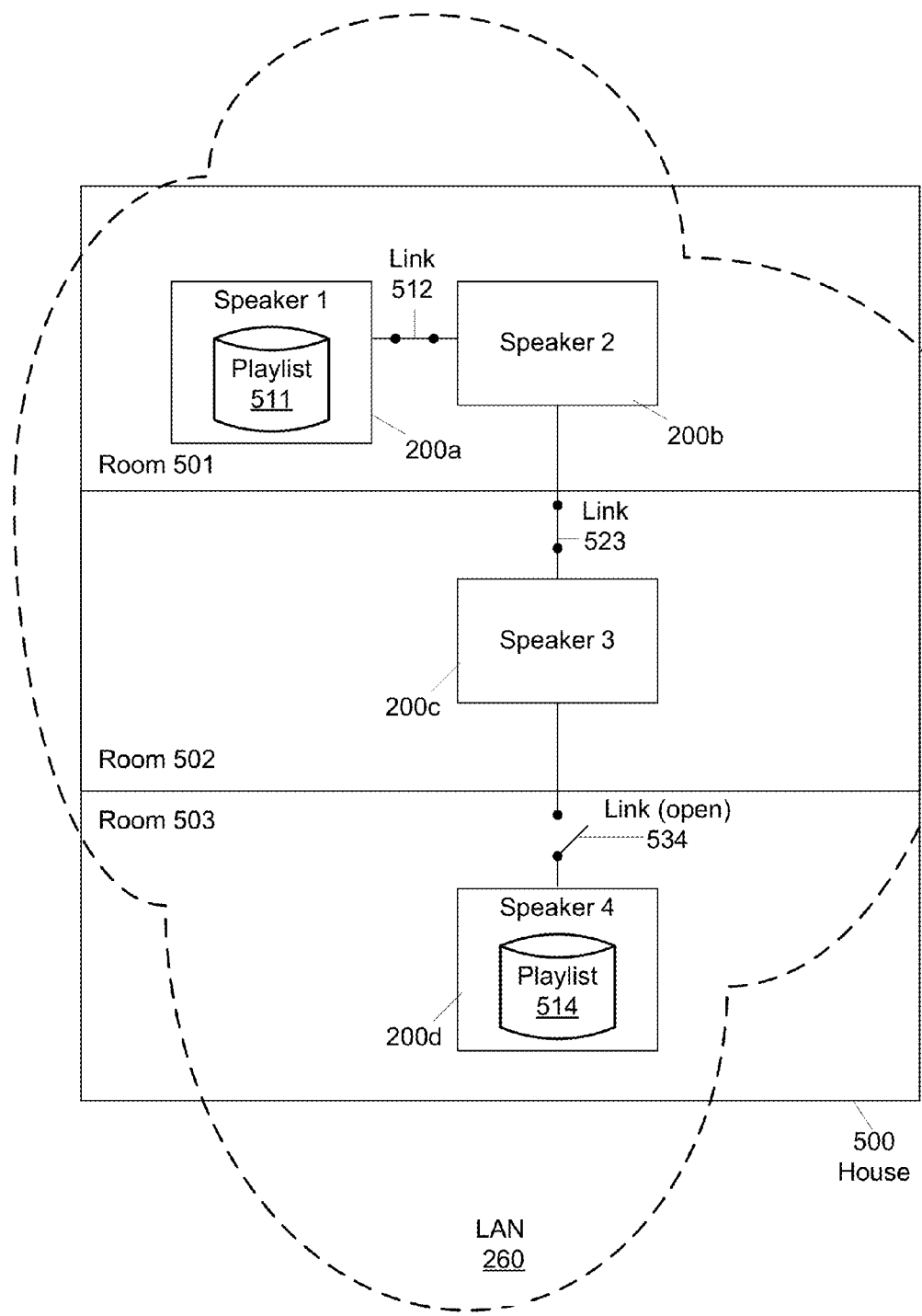
FIG. 5 is a schematic diagram illustrating a system having several license managing music rendering devices.

FIG. 5 shows an exemplary embodiment of a multi-speaker system. A house 500 includes four speakers 200a-d arranged in three rooms 501, 502, 503. The house 500 is substantially encompassed by a local area network 260, for example, a household wireless network. The first room 501 includes a first speaker 200a and a second speaker 200b. The second room 502 includes a third speaker 200c. The third room 503 includes a fourth speaker 200d. The first speaker 200a, the second speaker 200b, and the third speaker 200c are commonly controlled, as indicated by a first control link 512 between the first speaker 200a and the second speaker 200b, and a second control link between the second speaker 200b and the third speaker 200c. As described above, linked speakers 200 share a first playlist (playlist 511 in this case) in common and common transport control for the rendering songs from the first playlist 511. In contrast, an open link, such as link 534 between the third speaker 200c and the fourth speaker 200d, indicates that the fourth speaker 200d in the third room 503 has independent transport control, and the fourth speaker 200d renders songs from an independent second playlist 514.

For purposes of illustration, the first room 501 may be a combined kitchen-living room space, where the first speaker 200a is in the living room and the second speaker 200b is located in the kitchen. The second room 502 may be a den, containing the third speaker 200c, so that persons in the kitchen, living room and den are all listening to rendering of the first playlist 511. The third room 503 may be a basement, where the fourth speaker 200d is independently rendering the second playlist 514.

As described above, the first playlist 511 and the second playlist 514 both draw songs from a song library 252 (FIG. 2), where the song library 252 (FIG. 2) may be stored in the storage device 250 (FIG. 2) in any one of the speakers 200a-d, may be redundantly stored on all of the speakers 200a-d, or may be distributed across the storage devices of 250 (FIG. 2) in two or more of speakers 200a-d.

While FIG. 5 depicts the speakers 200a-d as being serially linked for simplicity, other link connections may be preferable, for example, a star connection, or individual connections through the LAN 260 via a virtual hub (not shown). Similarly, while the diagram depicts links between speakers as open and closed switches, this does not indicate that a link establishes or breaks communication between the speakers 200. Instead the switches merely depict that a closed link establishes a control relationship between speakers and an open link indicates independent control.

It should also be noted that the speakers 200a-200d may be hard wired to one another, or wirelessly networked together via the LAN 260 (FIG. 2) or the cellular network 285 (FIG. 2).

Figure 6:
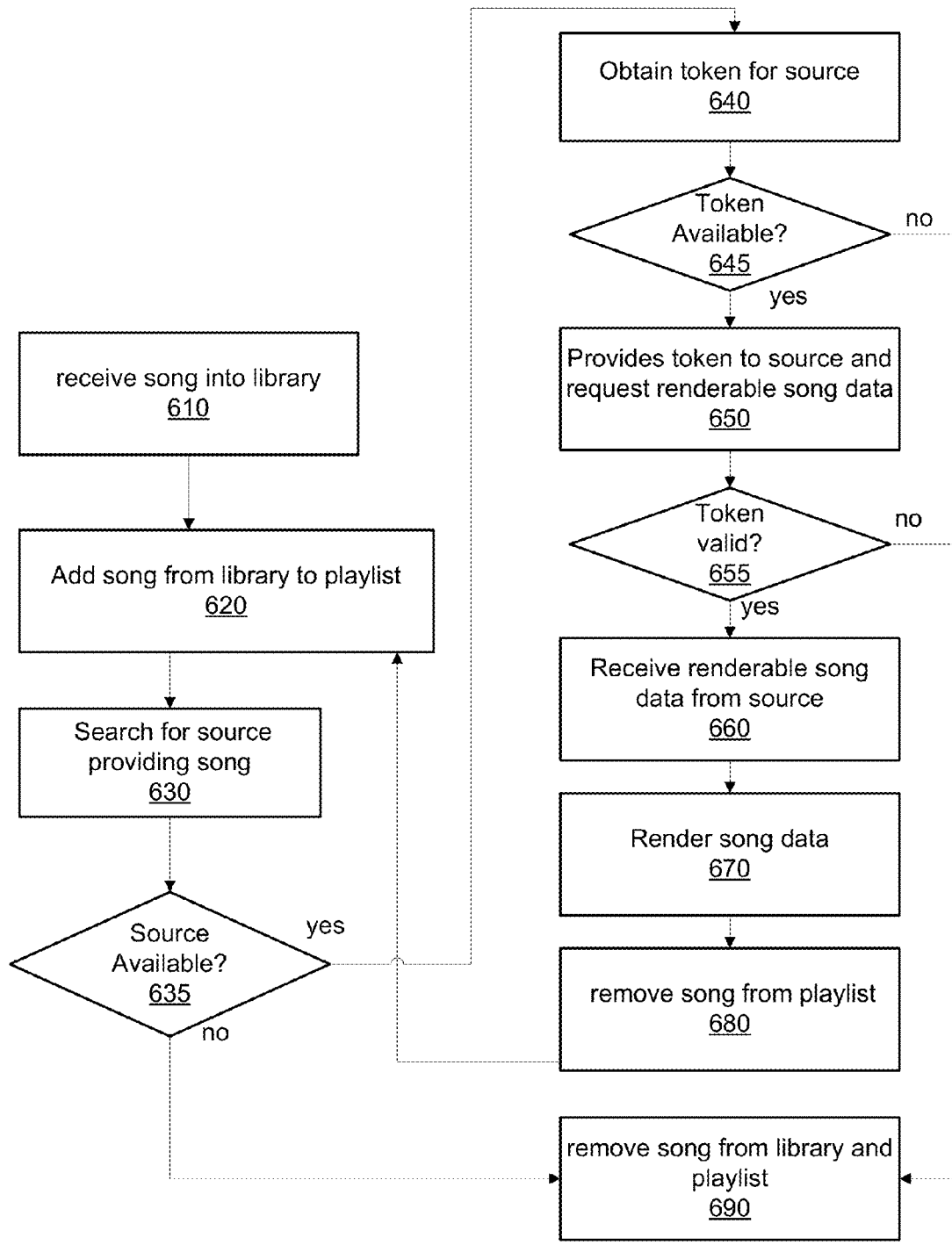
FIG. 6 is a flowchart of a first exemplary method for rendering digital multimedia by a networked device.

FIG. 6 is a flowchart of a first exemplary embodiment of a method for rendering digital media by a networked rendering device. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The flowchart of FIG. 6 maps the life cycle of a song added to a rendering device of the present invention, for example, the first embodiment of a rendering device such as the speaker 200 as shown by FIG. 2. As described above, a song is generally a collection of metadata identifying a recording. A song is received into a song library of the rendering device by the song library manager 352 (FIG. 3), as shown in block 610. For example, the song may be selected by the user of an electronic device containing the recording media file, or may be available from a music streaming source available to the song rendering device via a network.

The song is selected from the library and added to a playlist 258 (FIG. 4) by the playlist manager 358 (FIG. 3), as shown in block 620. The selection may be via an application listing songs from the library, for example via the user interface manager 360 (FIG. 3). The rendering device searches for a source providing a recording of the song, as shown in block 630. This search is performed by the source manager 354 (FIG. 3), and may occur when, or shortly before, the song reaches the head of the playlist. As described previously, the source may be a local storage device, a networked storage device, or a digital media streaming service, among others. As shown by block 635, a branch occurs depending upon whether or not the search determines a source for the song is available. If the source for the song is not available, the song is removed from the library by the song library manager 352 (FIG. 3) and removed from the playlist by the playlist manager 358 (FIG. 3), as shown by block 690.

If the source is available, the token manager 356 (FIG. 3) of the song rendering device attempts to obtain a token for the source, as shown by block 640. For example, the token manager 356 (FIG. 3) may send a message requesting a token directly to a network server provided by the source. The message requesting the token may include, for example, the identity of the subscriber to the source, the type of service the subscriber may access, the song being requested, and an access key to the source, for example, an account password. Alternatively, requests for tokens may be handled by an intermediate web server, or proxy server, that acts as an agent between the token manager 356 (FIG. 3) and one or more song sources. The proxy server accepts the token request from the token manager 356 (FIG. 3) and formats a token request according to a specific API provided by the source. In this way, the rendering device does not have to be updated when sources are added or change their APIs, and instead only the proxy server need be updated.

As shown by block 645, a branch occurs depending upon whether or not the token manager 356 (FIG. 3) determines a token is available. If a token is not available, the song is removed from the library and the playlist, as shown by block 690. If a token is available, the token manager 356 (FIG. 3) of the song rendering device provides the token to the source, as shown by block 650, and requests transmission of renderable song data (a recording) from the source.

In some instances, the token may not be valid. For example, the user of the source associated with the token may be accessing the source from another network, thereby invalidating the token. For example, a source may deny a token if the user associated with the token is currently accessing another stream from the source, for instance, on another network. In such an instance, a branch occurs depending upon whether or not the search determines a token is valid, as shown in block 655. If the token is not valid, the song is removed from the library and the playlist, as shown by block 690. If the token is valid, the source may begin transmitting the recording to the rendering device. For example, the source may stream digital media of a recording of the song addressed to the rendering device via the network. The rendering device receives the renderable song data, as shown by block 660, and the rendering manager 340 (FIG. 3) renders the song data, as shown by block 670. After the song data is rendered, the rendering device may remove the song from the playlist, as shown by block 680. In accordance with one embodiment, the song may remain in the library after being removed from the playlist. The song may then be added to the playlist again by the playlist manager 358 (FIG. 3), as shown by block 620.

In alternative embodiments, instead of removing the song from the library and/or playlist if a song cannot be rendered, the rendering device may not remove the song from the library and/or playlist, and merely proceed to the next song in the playlist. At a future time, the rendering device may again seek to render the song.

An application on a network device, for example, a smart phone, may receive a playlist as input and search for sources for songs in the playlist for rendering. If no source subscribed to by the user of the application provides a song in the playlist, the application may provide a list of sources that do provide the song and give the user the option to purchase the song. For example, the application may iteratively contact sources from a list of sources and query each source for availability of the song and, if the song is available, for pricing and purchasing options for accessing the song. Alternatively, the application may communicate with an intermediate web server, as described above, that acts as an agent to interact with song sources. The application may order returned results in several ways, for example, first presenting sources subscribed to by the user of the network device, by price, or sources may be prioritized based on revenue agreements with the application provider.

Figure 7:
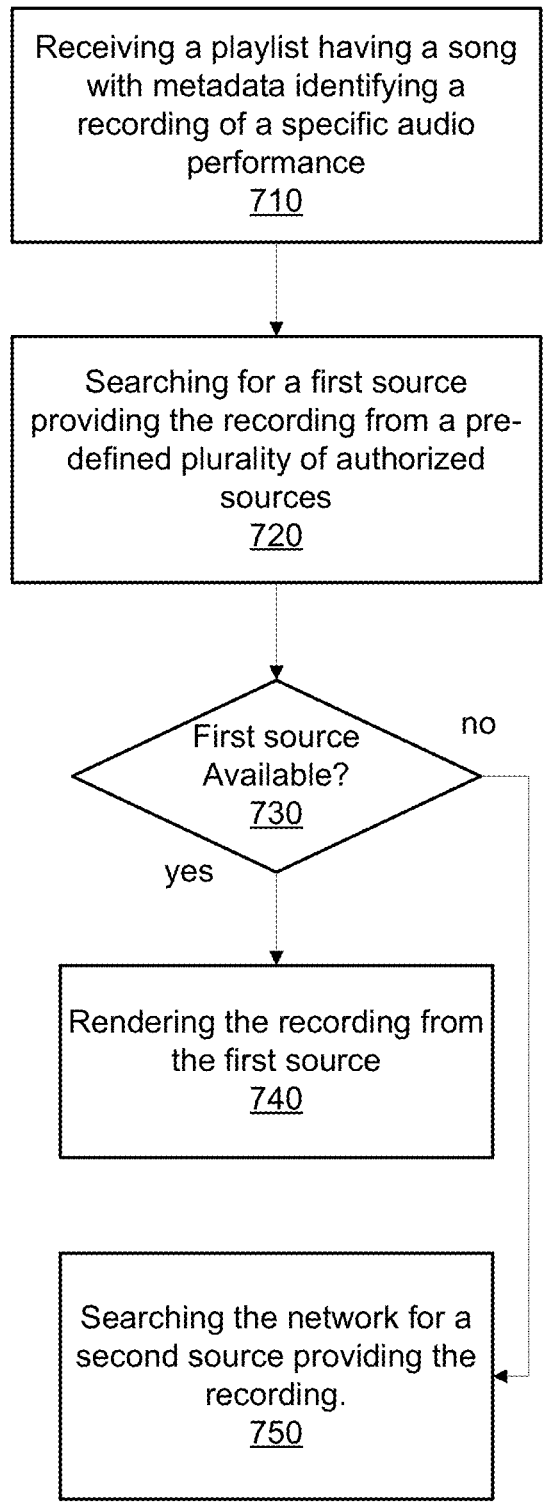
FIG. 7 is a flowchart of a second exemplary method for rendering digital multimedia by a networked device.

FIG. 7 is a flowchart illustrating a second method for rendering digital media by a networked device. Under the second method, a device or application receives a playlist of songs that may not be associated with a library of songs accessible to the device/application. The playlist is received by the device/application, as shown in block 710. The playlist contains one or more songs, where each song includes metadata identifying a recording of a specific audio performance. In general, the song does not include data for rendering the recording. The device/application searches for a first source providing the recording from a predefined plurality of authorized sources. For example, a particular device/application may be able to access media files on a local hard drive as a first source and be authorized to access a first streaming digital media service as a second source. The device/application may search for a first source providing the song by browsing an index of files on the local hard drive and sending a search query to the first streaming service. If the device/application finds a first source for the song as a result of the search, thereby determining a source for the song is available (block 730), the device/application renders the recording provided by the first source, as shown by block 740. For example, this rendering may involve playback of a media file in storage, or rendering a stream from a streaming service.

If a first source is not one of the plurality of authorized sources available to the device/application, the device/application searches the network for a second source providing the recording, as shown in block 750. For example, the device/application may browse the internet to find a streaming source not currently subscribed to by the device/application, or a retailer providing media file downloads. The device/application may then query the user of the device/application whether the user wishes to obtain authorization to render the recording from the second source, for example, by purchasing a download, purchasing a one-shot stream, or subscribing to a streaming service. The device/application may broker the authorization between the user and the second service, and then render the recording from the second source. The device/application may then add the second source to the pre-defined plurality of authorized sources, for searches for subsequent sources for songs.

Figure 8:
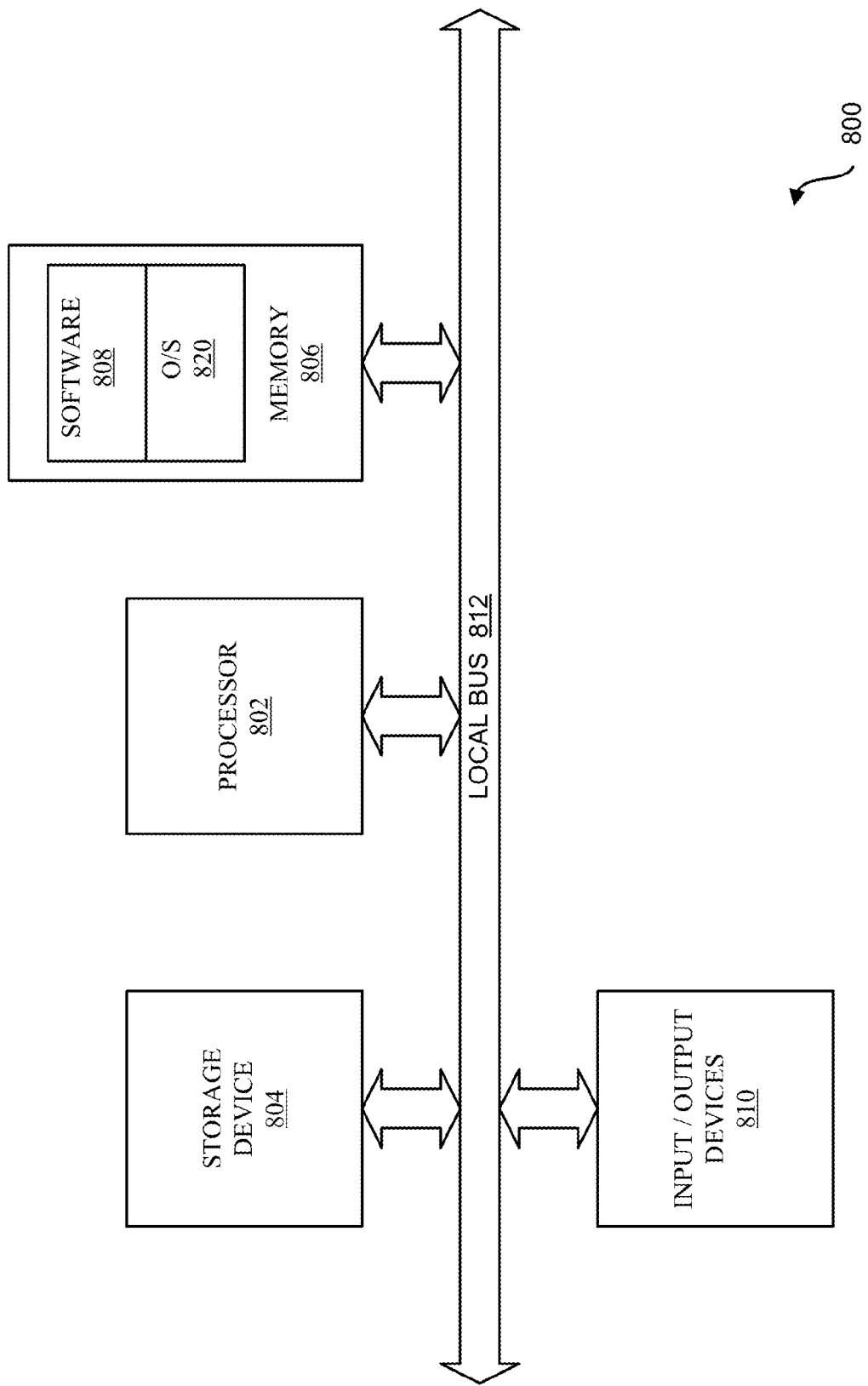
FIG. 8 is a schematic diagram illustrating an example of a system for executing functionality of the present invention.

As previously mentioned, the present system for executing the functionality described in detail above may be a computer, an example of which is shown in the schematic diagram of FIG. 8. The system 800 contains a processor 802, a storage device 804, a memory 806 having software 808 stored therein that defines the abovementioned functionality, input and output (I/O) devices 810 (or peripherals), and a local bus, or local interface 812 allowing for communication within the system 800. The local interface 812 can be, for example but not limited to, one or more buses or other wired or wireless connections, as is known in the art. The local interface 812 may have additional elements, which are omitted for simplicity, such as controllers, buffers (caches), drivers, repeaters, and receivers, to enable communications. Further, the local interface 812 may include address, control, and/or data connections to enable appropriate communications among the aforementioned components.

The processor 802 is a hardware device for executing software, particularly that stored in the memory 806. The processor 802 can be any custom made or commercially available single core or multi-core processor, a central processing unit (CPU), an auxiliary processor among several processors associated with the present system 800, a semiconductor based microprocessor (in the form of a microchip or chip set), a macroprocessor, or generally any device for executing software instructions.

The memory 806 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 806 may incorporate electronic, magnetic, optical, and/or other types of storage media. Note that the memory 806 can have a distributed architecture, where various components are situated remotely from one another, but can be accessed by the processor 802.

The software 808 defines functionality performed by the system 800, in accordance with the present invention. The software 808 in the memory 806 may include one or more separate programs, each of which contains an ordered listing of executable instructions for implementing logical functions of the system 800, as described below. The memory 806 may contain an operating system (O/S) 820. The operating system essentially controls the execution of programs within the system 800 and provides scheduling, input-output control, file and data management, memory management, and communication control and related services.

The I/O devices 810 may include input devices, for example but not limited to, a keyboard, mouse, scanner, microphone, etc. Furthermore, the I/O devices 810 may also include output devices, for example but not limited to, a printer, display, etc. Finally, the I/O devices 810 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 800 is in operation, the processor 802 is configured to execute the software 808 stored within the memory 806, to communicate data to and from the memory 806, and to generally control operations of the system 800 pursuant to the software 808, as explained above.

As noted above, in alternative embodiments, functions performed by one or more of the modules of the controller 210 depicted in FIG. 3 may be performed by a device external to the speaker 200 (FIG. 2), for example, an intermediate web server that acts as an agent between the speaker 200 (FIG. 2) and one or more digital media services 295 (FIG. 2).

Figure 9:
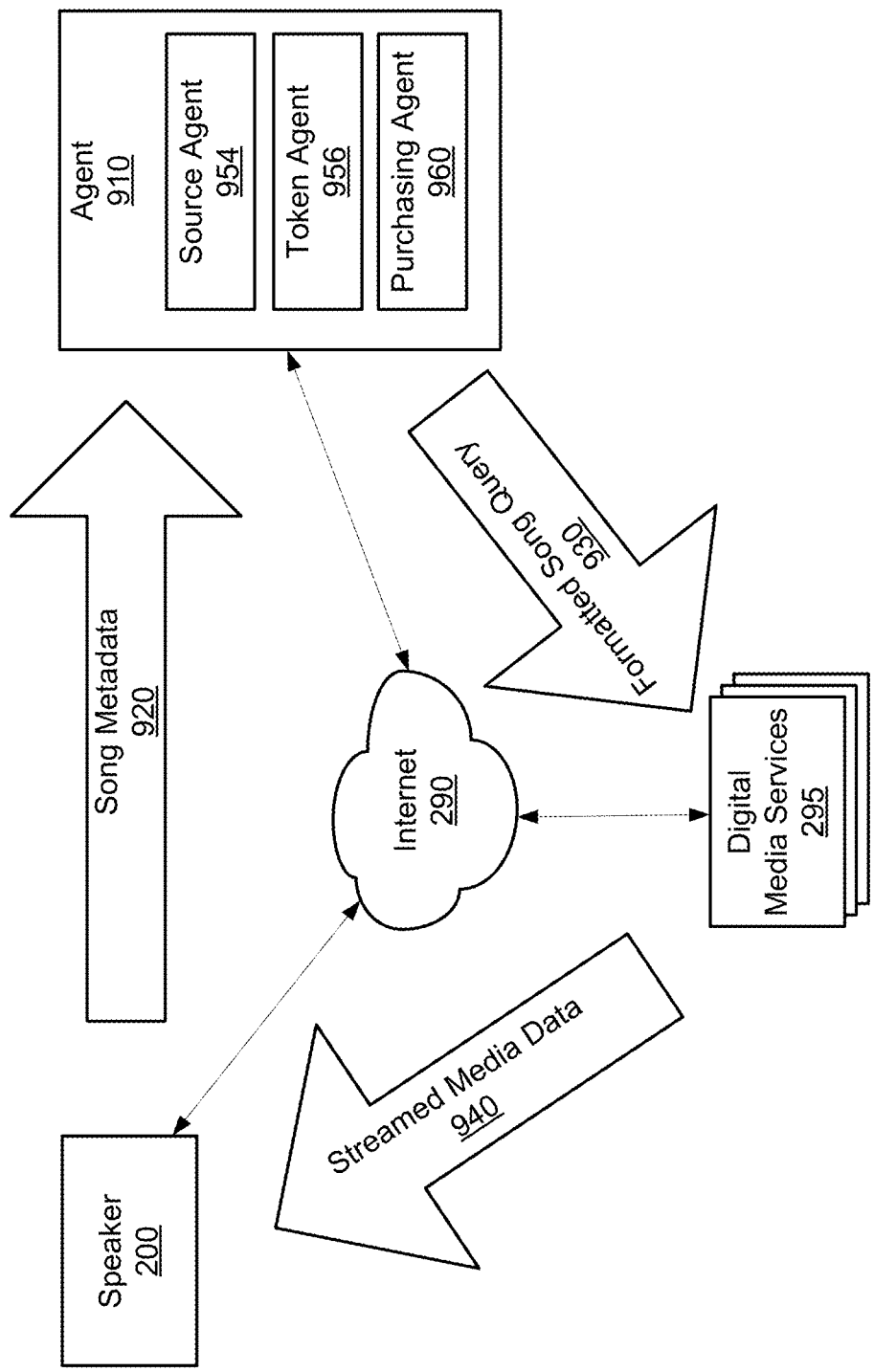
FIG. 9 is a schematic diagram of an exemplary speaker system including an external agent for executing functionality of the present invention.

FIG. 9 shows an exemplary embodiment of a system where a speaker 200 communicates with one or more digital media services 295 via an agent 910. The speaker 200, the digital media services 295, and the agent 910 generally communicate with one another via the internet 290. The agent 910 may include one or more applications, for example, applications hosted by one or more web servers located remotely from the speaker 200 and/or the digital media services 295. The agent 910 includes one or more functional modules 954, 956, 960 that may function in coordination with modules in the controller 210 (FIG. 3) of the speaker 200, or may supplant the functionality of one or more modules in the controller 210 (FIG. 3) of the speaker 200.

In general, the agent 910 may serve as an intermediary between the speaker 200 and a source, in particular, a digital media service 295. In this way, the speaker 200 may operate without knowledge of the interfaces provided by each the digital media services 295, and instead interact with the digital media services 295 by exchanging messages with the agent 910 containing the same song metadata used internally within the speaker 200. The source agent module 954 receives queries from the speaker 200 containing song metadata and translates the query type and metadata into formats understood by digital media services 295 and other sources. The token agent module 956 serves as an intermediary between the speaker 200 and a digital media service 295 to handle authorization for streaming digital media, as described previously.

For example, the speaker 200 may send the agent 910 a message 920 containing song metadata requesting streaming of the song. The message may specify a specific source, or the source agent 954 may query one or more digital media services 295 to locate a suitable source. The token agent 956 then formats a message to the selected source and provides the source with authenticating information authorizing the selected digital media services 295 to transmit a stream of digital media data 940 to the speaker 200. The digital media services 295 may then supply a token directly to the speaker 200. Alternatively, the digital media services 295 may transmit the token to the agent 910, where the agent 910 in turn forwards the token to the speaker 200. The speaker then provides the token to the digital media service 295 to initiate the streaming of media data 940, for example, when the song reaches the head of a playlist (FIG. 4).

In instances where obtaining a token involves a financial transaction, the purchasing agent 960 serves as an intermediary between the speaker 200 and the digital media services 295 to authorize payment to an account of a user of the digital media service 295, or to redeem credit from the account of a user.

The arrangement of this embodiment generally simplifies the operation of the software modules within the controller 210 (FIG. 3) of the speaker, and centralizes the functions that where the speaker 200 interacts with sources, such as digital music services 295. For example, if a digital music service 295 changes its API, only the agent 910 need be updated to accommodate the changes. Similarly, when new sources become available, the speaker 200 may access the new sources without modification once the agent 910 is updated to communicate with the new source.

For example, the speaker 200 may query the agent 910 with regard to a song by sending a query message 920 containing song metadata to the agent 910. The agent 910 then uses the received song metadata to format one or more query messages 930 to one or more digital media services 295, where each query message is formatted according to an API of the digital media service 295. The agent 910 may then obtain a token from one of the digital media services 295 for the song and provide the token to the speaker 200. The speaker 200 may then provide the token to the digital media service 295 that supplied the token, whereupon the digital media service 295 streams media data 940 for rendering the song to the speaker 200.

In alternative embodiments, one or more functions of the agent 910 may be performed by an application co-located with the digital media service 295. While FIG. 9 depicts the agent 910 having three functional modules, the source agent 954, the token agent 956, and the purchasing agent 960, alternative embodiments of the agent 910 may include additional functional modules providing intermediary services between the speaker 200 and the digital music services 295.

It should be noted that while FIG. 9 indicates a directional data flow from the speaker 200 to the agent 910, from the agent 910 to the digital media services 295, and from the digital media services 295 to the speaker 200, messages may be exchanged in either direction between any of the speaker 200, the agent 910, and the digital media services 295.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing authorization for playback of multimedia recordings from a plurality of devices within a local area network (LAN) of a networked rendering device including a hardware processor and a memory, comprising the steps of:
   receiving a song comprising metadata identifying a recording;
   searching the plurality of devices within the LAN for an authorized source of the recording;
   if an authorized source is available from at least one of the plurality of devices, receiving said recording from said authorized source; and
   if an authorized source is not available, optionally searching for a source configured to make the recording identified by the song available for rendering to provide said song, obtaining a token authorizing said source to deliver said recording to said rendering device, providing said token to said source, and receiving said recording from said source.

2. The method of claim 1, further, comprising the step of rendering said recording by said rendering device.

3. The method of claim 2, further comprising the step of determining a validity of said token at a time of said rendering.

4. The method of claim 1, further comprising the steps of:
   providing a song library configured to store a plurality of songs; and
   providing a playlist configured to contain one or more songs from said library.

5. The method of claim 4, further, comprising the step of publishing a library list comprising a description of said plurality of songs in said library.

6. The method of claim 4, further comprising the step of providing an interface configured to:
   add a song from said library to said playlist;
   remove a song from said playlist; and
   reorder at least two songs in said playlist.

7. The method of claim 1, wherein said step of searching for a source further comprises the steps of:
   storing a list of sources;
   selecting a first source from said list of sources;
   querying said first source for said song; and
   if said querying said first source indicates said first source does not include said song, selecting a second source from said list of sources, and querying said second source for said song.

8. The method of claim 7, further comprising the steps of:
   storing a list of tokens; and
   removing a source from said list of sources if no token in said list of tokens is associated with said source.

9. The method of claim 8, further comprising the step of removing a token from said list of tokens if a source associated with said token rejects said token.

10. The method of claim 1, wherein said step of receiving said recording comprises receiving a downloaded media file of said recording or receiving a transmitted stream of said recording.

11. A method for managing authorization for rendering recordings from a plurality of devices of a plurality of users within a local area network (LAN) of a networked rendering device including a hardware processor and a memory, comprising the steps of:
   receiving a song comprising metadata identifying a recording into a song library;
   adding said song to a playlist;
   searching local media of the plurality of devices within the LAN for an authorized source of the recording; and
   (a) if an authorized source is available from at least one of the plurality of devices, receiving said recording from said authorized source; and
   (b) if an authorized source is not available, optionally searching for a source configured to make the recording identified by the song available for rendering to provide said song; and receiving said recording from said source.

12. The method of claim 11, further comprising the step of rendering said recording.

13. The method of claim 11, further comprising the steps of:
   obtaining a token authorizing said source to deliver said recording to said rendering device; and
   providing said token to said source.

14. The method of claim 13, further comprising the step of removing said song from said playlist and said library if:
   said step of searching does not result in finding a source providing said song;
   said step of obtaining does not result in a token associating said song with said source; or
   providing said token to said source results in said source rejecting said token.

15. A method for managing digital media from a plurality of devices of a plurality of users within a local area network (LAN) by a hardware processor with a memory, comprising the steps of:
   receiving a playlist comprising a song comprising metadata identifying a recording;
   searching for a first source configured to make the recording identified by the song available for rendering to provide said recording from a pre-defined plurality of authorized sources on at least one of said plurality of devices within the LAN;
   if said searching yields said first source, rendering, by a networked rendering device within the LAN, said recording from said first source, said first source being a local source; and
   if said searching does not yield said first source, searching for a second source configured to make the recording identified by the song available for rendering to provide said recording, said second source being an external source.

16. The method of claim 15, further comprising the step of querying a user whether said user wishes to obtain authorization to render said recording from said second source.

17. The method of claim 16, further comprising the steps of:

brokering between said second source and said user, an authorization to render said recording from said second service; and rendering said recording from said second source.

18. The method of claim 17, further comprising the step of adding said second source to said pre-defined plurality of authorized sources.

19. The method of claim 15, wherein said second source is not one of said pre-defined plurality of authorized sources.

20. A rendering device for rending digital media in a network, comprising:
- a network interface between the rendering device, a local area network (LAN), the internet and a cellular network;
- a memory;
- a hardware processor;
- a plurality of storage devices in the LAN of the rendering device;
- a song library stored in at least one of said storage devices; and
- a playlist stored in at least one of said storage devices;
- wherein said hardware processor is configured to execute non-transitory instructions stored in said memory to perform steps comprising;
- receiving a song comprising metadata identifying a recording of a specific audio performance into said song library;
- adding said song to said play list;
- searching local media of the plurality of storage devices within the LAN for an authorized source of the recording;
- if an authorized source is available, receiving said recording from said authorized source, and rendering said recording by said rendering device; and
- if an authorized source is not available, optionally searching for a source configured to make the recording identified by the song available for rendering to provide said song, receiving said recording from said source, and rendering said recording by said rendering device,
- wherein said recording is not retained in said memory after said rendering.

21. The device of claim 20, further comprising an audio transducer.

22. The device of claim 20, further comprising an analog input port.

23. The device of claim 22, wherein said receiving said recording from said source is via said analog input port.

24. The device of claim 20, further comprising a digital media access port.

25. The device of claim. 24, wherein said receiving said recording from said source is via said digital media access port.

26. The device of claim 24, wherein said receiving said recording from said source is via said network interface.

27. The device of claim 26, wherein said source comprises a digital media streaming service.

28. A system for rendering digital media in a network comprising:
- a first digital media rendering device comprising:
- a network interface between the first media rendering device, a local area network (LAN), the internet and a cellular network;
- a plurality of storage devices in the LAN, a least one of said storage devices comprising a song library and a playlist, the first media rendering device being within the LAN;
- a memory;
- a hardware processor configured to execute non-transitory instructions stored in said memory to perform the steps of;
- receiving a song comprising metadata identifying a recording into said song library;
- adding said song to said playlist;
- searching the local media of the plurality of storage devices within the LAN for an authorized source configured to make the recording identified by the song available for rendering to provide said song;
- receiving said recording from said authorized source; and
- rendering, by said rendering device, said recording,
- wherein said recording is not retained in said memory after said rendering; and
- a second digital media rendering device within the LAN,
- wherein said second digital media rendering device is switchably configured to render said recording in synchronization with said first digital media rendering device.

29. The system of claim 28, wherein said song library is accessible to said second digital media rendering device.

30. The system of claim 29, wherein said song library is distributed between said first media rendering device and said second media rendering device.

* * * * *